United States Patent
Okayama

(10) Patent No.: US 9,780,903 B2
(45) Date of Patent: Oct. 3, 2017

(54) OPTICAL WAVELENGTH DEMULTIPLEXER HAVING OPTICAL INTERFERENCE FILTERS CONNECTED IN CASCADE

(71) Applicant: Oki Electric Industry Co., Ltd., Tokyo (JP)

(72) Inventor: Hideaki Okayama, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 193 days.

(21) Appl. No.: 14/606,676

(22) Filed: Jan. 27, 2015

(65) Prior Publication Data
US 2015/0295672 A1 Oct. 15, 2015

(30) Foreign Application Priority Data

Apr. 11, 2014 (JP) ................................. 2014-081809

(51) Int. Cl.
*H04J 14/06* (2006.01)
*H04J 14/08* (2006.01)
(Continued)

(52) U.S. Cl.
CPC ............ *H04J 14/02* (2013.01); *G02B 6/2938* (2013.01); *G02B 6/29344* (2013.01); *G02B 6/29355* (2013.01); *G02B 6/29397* (2013.01)

(58) Field of Classification Search
CPC .... H04J 14/02; H04J 14/0221; H04J 14/0212; H04J 14/0206; H04J 14/0247;
(Continued)

(56) References Cited

U.S. PATENT DOCUMENTS 6,256,433 B1 * 7/2001 Luo ..................... G02B 6/29332
385/17
6,538,787 B1 * 3/2003 Moeller ................. G02B 6/272
359/249
(Continued)

FOREIGN PATENT DOCUMENTS

JP 2003-149472 A 5/2003
JP 2009-198914 A 9/2009

OTHER PUBLICATIONS

Wim Bogaerts et al., "Silicon-on-Insulator Spectral Filters Fabricated With CMOS Technology", IEEE Journal of Selected Topics in Quantum Electronics, vol. 16, No. 1, (Feb. 5, 2010).
(Continued)

*Primary Examiner* — Ken N Vanderpuye
*Assistant Examiner* — Abbas H Alagheband
(74) *Attorney, Agent, or Firm* — Rabin & Berdo, P.C.

(57) ABSTRACT

An optical wavelength demultiplexer includes a wavelength demultiplexing device, a first wavelength filter and a first- and second-stage wavelength sub-filters. The wavelength demultiplexing device demultiplexes an input light into a first wavelength band including wavelengths $\lambda_1$ and $\lambda_2$ in the vicinity of 1310 nm and a second wavelength band including a wavelength $\lambda_3$ of 1490 nm and a wavelength $\lambda_4$ of 1550 nm to output. The first-stage wavelength sub-filter removes the wavelength $\lambda_2$ longer than 1310 nm from the second wavelength band and transmits the wavelength $\lambda_3$ of 1490 nm. The second-stage wavelength sub-filter removes the wavelength $\lambda_4$ of 1550 nm and outputs the wavelength $\lambda_3$ of 1490 nm, which is the remainder of the selected lights, with a sufficient wavelength spectral purity.

2 Claims, 8 Drawing Sheets

(51) Int. Cl.
*H04J 14/02* (2006.01)
*G02B 6/293* (2006.01)

(58) Field of Classification Search
CPC ............ H04J 14/0252; G02B 6/29344; G02B 6/2938; G02B 6/29355; G02B 6/29397; G02B 6/12007; G02B 6/1128; G02B 6/12; G02B 6/4246; G02B 6/29385; G02B 6/28; G02B 6/105; G02B 6/125; G02B 6/12028; H04B 10/25; H04B 2210/258
USPC .... 398/65, 91, 45, 215, 183; 385/12, 14–15, 385/22, 37, 42, 39
See application file for complete search history.

(56) References Cited

U.S. PATENT DOCUMENTS

| | | | | |
|---|---|---|---|---|
| 6,567,196 B1* | 5/2003 | Archambault | .......... | H04J 14/02 398/79 |
| 6,754,411 B2* | 6/2004 | Ahmadvand | .......... | H04J 14/02 385/24 |
| 6,925,220 B2* | 8/2005 | Mukai | .......... | G02B 6/2813 385/16 |
| 6,999,652 B2* | 2/2006 | Mino | .......... | G02F 1/31 385/129 |
| 7,099,586 B2* | 8/2006 | Yoo | .......... | H04B 10/299 398/173 |
| 7,110,639 B2* | 9/2006 | Fukuda | .......... | G02B 6/29353 385/24 |
| 7,116,859 B2* | 10/2006 | Mino | .......... | G02F 1/31 385/129 |
| 7,177,495 B2* | 2/2007 | Mino | .......... | G02F 1/31 385/14 |
| 7,206,473 B2* | 4/2007 | Mino | .......... | G02F 1/31 385/14 |
| 7,376,356 B2* | 5/2008 | Madsen | .......... | H04J 14/0298 398/183 |
| 7,469,079 B2* | 12/2008 | Nara | .......... | G02B 6/12007 385/14 |
| 7,885,493 B2* | 2/2011 | Nara | .......... | G02B 6/12007 385/14 |
| 7,974,502 B2* | 7/2011 | Mino | .......... | G02F 1/31 359/288 |
| 8,023,781 B2* | 9/2011 | Nara | .......... | G02B 6/12007 385/14 |
| 8,682,121 B2* | 3/2014 | Okayama | .......... | G02B 6/12007 385/27 |
| 8,879,873 B2* | 11/2014 | Goh | .......... | H04B 10/5161 385/3 |
| 8,948,546 B2* | 2/2015 | Saida | .......... | H04B 10/5053 359/248 |
| 2001/0017959 A1* | 8/2001 | Alexander | .......... | G02B 6/12019 385/24 |
| 2001/0024543 A1* | 9/2001 | Ahmadvand | .......... | G02B 6/29355 385/24 |
| 2002/0150329 A1* | 10/2002 | Ahn | .......... | G02B 6/305 385/24 |
| 2002/0154850 A1* | 10/2002 | Xie | .......... | G02B 6/12007 385/15 |
| 2004/0037563 A1* | 2/2004 | Augustsson | .......... | G02B 6/29353 398/83 |
| 2004/0067022 A1* | 4/2004 | Chen | .......... | G02B 6/1221 385/42 |
| 2004/0086220 A1* | 5/2004 | Mino | .......... | G02F 1/31 385/22 |
| 2004/0202425 A1* | 10/2004 | Lee | .......... | G02B 6/12007 385/39 |
| 2005/0163459 A1* | 7/2005 | Deliwala | .......... | B82Y 20/00 385/147 |
| 2005/0276539 A1* | 12/2005 | Fukuda | .......... | G02B 6/29353 385/24 |
| 2006/0034563 A1* | 2/2006 | Mino | .......... | G02F 1/31 385/22 |
| 2006/0034564 A1* | 2/2006 | Mino | .......... | G02F 1/31 385/22 |
| 2006/0115200 A1* | 6/2006 | Van Der Vliet | .......... | G02B 6/1228 385/12 |
| 2007/0071388 A1* | 3/2007 | Lu | .......... | G02B 6/12016 385/37 |
| 2007/0104409 A1* | 5/2007 | Nara | .......... | G02B 6/12007 385/14 |
| 2007/0154137 A1* | 7/2007 | Mino | .......... | G02F 1/31 385/16 |
| 2009/0110393 A1* | 4/2009 | Nara | .......... | G02B 6/12007 398/45 |
| 2010/0329679 A1* | 12/2010 | Little | .......... | H04J 14/02 398/79 |
| 2011/0064355 A1* | 3/2011 | Soma | .......... | G02B 6/12019 385/14 |
| 2011/0097035 A1* | 4/2011 | Nara | .......... | G02B 6/12007 385/14 |
| 2013/0039662 A1* | 2/2013 | Brooks | .......... | G02B 6/12007 398/91 |
| 2013/0209112 A1* | 8/2013 | Witzens | .......... | G02B 6/2813 398/214 |
| 2013/0315524 A1* | 11/2013 | Saida | .......... | H04B 10/5053 385/3 |
| 2015/0241633 A1* | 8/2015 | Kusaka | .......... | G02B 6/125 385/1 |

OTHER PUBLICATIONS

Folkert Horst, "Silicon Integrated Waveguide Devices for Filtering and Wavelength Demultiplexing", OFC/NFOEC 2010, paper OWJ3, Mar. 2010.

* cited by examiner

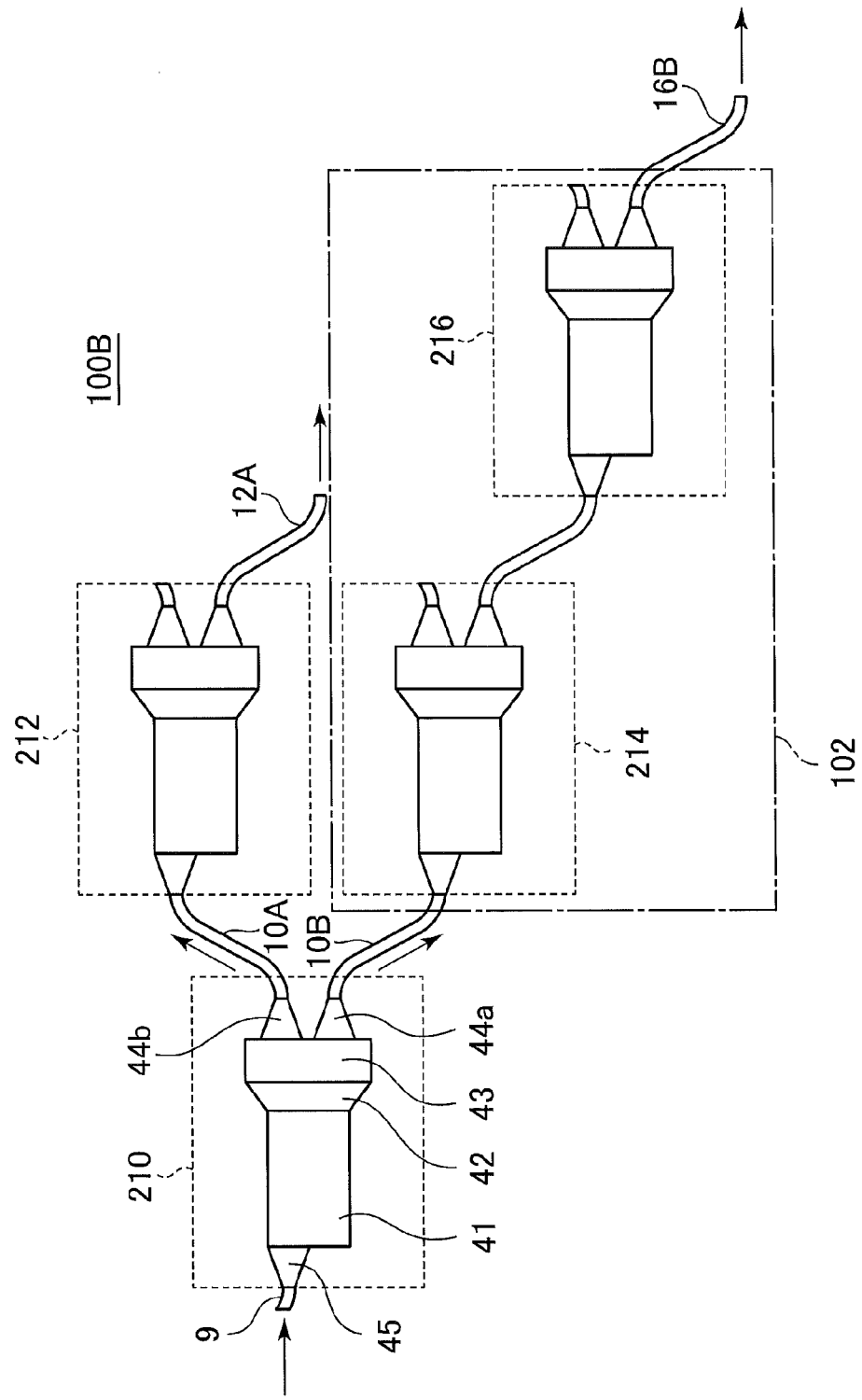

OPTICAL WAVELENGTH DEMULTIPLEXER HAVING OPTICAL INTERFERENCE FILTERS CONNECTED IN CASCADE

BACKGROUND OF THE INVENTION

Field of the Invention

The present invention relates to an optical wavelength demultiplexer, and more particularly to an optical wavelength demultiplexer for polarization-independently performing wavelength selection suitable for use in a wavelength multiplexing communication system and the like.

Description of the Background Art

Recently, there has been put into practical use a telecommunications network system having the configuration of an access optical communication called Fiber-To-The-Home (FTTH), in which subscriber lines are directly led into users' private premises in the so-called last one mile from a central-office facility. One of the advantages of employing the FTTH system is that it can provide communication services and video distribution services with a single optical fiber line.

In communication services, the passive optical network (PON) system, inter alia, the GE-PON (Gigabit Ethernet-PON) communication system is becoming a mainstream, which communicates over an access section at an ultra-high speed of 1 Gbit/s according to the PON scheme, "Ethernet" being a trademark. The PON communication system is of a form of communication system which connects, by optical fiber lines and an optical star coupler, an optical line terminal (OLT) disposed in a central office and optical network units (ONUs) disposed in respective subscriber premises and in which the OLT is shared by the plural ONUs. In the GE-PON communication system, Internet connection services and IP (Internet Protocol) telephone services are provided by establishing IP data communications in which a wavelength of 1310 nm is assigned to uplink data signals and a wavelength of 1490 nm is assigned to downlink data signals.

For video distribution services, for example, many of CATV (Community Antenna Television) service providers are also employing the FTTH system. In video distribution services through CATV and the like, video signals are distributed on a wavelength band of 1550 nm.

In the FTTH system, a signal light beam of the wavelength band of 1550 nm assigned to a video distribution service and a signal light beam of wavelengths of 1310 nm and 1490 nm assigned to a communication service are multiplexed with each other at an OLT to be distributed to ONUs. Therefore, the ONUs installed in subscriber premises utilizing the FTTH system require optical wavelength demultiplexers to separate the signal light of the wavelength band of 1550 nm and the signal light of the wavelengths of 1310 nm and 1490 nm from each other. Through the optical wavelength demultiplexer, the signal light assigned to the video distribution service and the signal light assigned to the communication service are split from each other.

In the ONUs or the like of FTTH systems, optical wavelength demultiplexers are constituted by wavelength demultiplexing devices, for example, WDM (Wavelength Division Multiplexing) filters. In manufacturing such demultiplexers, a technology using a silicon-based material as a waveguide material has attracted attention since it is excellent in mass productivity and miniaturization. This technology implements a silicon thin line waveguide as a wavelength demultiplexing device.

The silicon thin line waveguide is structured such that a silicon core is enclosed with a clad made of a material with its refractive index lower than the refractive index of the silicon core. The silicon thin line waveguide can strongly confine a light beam to be guided into the core since the refractive index difference between the silicon core and the clad can be set to be extremely large. Accordingly, it is possible to implement fine waveguides whose core dimension is in the order of submicron and hence to miniaturize wavelength demultiplexing devices such as a WDM filter formed therefrom.

Various optical wavelength demultiplexers have been practiced using silicon thin line waveguides, and have the basic structure thereof including a plurality of interferometer type wavelength filters utilizing the interference phenomenon of light. As an interferometer type wavelength filter, known is, for example, a wavelength demultiplexing device utilizing light interference, such as a Mach-Zehnder interferometer (MZI) type or a multimode interference (MMI) type device. In particular, wavelength demultiplexing devices of MZI type are commercialized as devices for demultiplexing light signals conveying information of two to four channels separable with respect to the wavelength. Refer to, for example, Wim Bogaerts, et. al., "Silicon-on-Insulator Spectral Filters Fabricated With CMOS Technology", IEEE Journal of Selected Topics in Quantum Electronics, vol. 16, No. 1, (2010), Folkert Horst, "Silicon Integrated Waveguide Devices for Filtering and Wavelength Demultiplexing", OFC/NFOEC 2010, paper OWJ3, March 2010, and Japanese Patent Laid-Open Publication Nos. 2009-198914 and 2003-149472.

An MZI type wavelength demultiplexing device is typically configured to connect MZI devices in multi-stage through directional couplers to obtain a wavelength separation characteristic intended. However, directional couplers have the coupling coefficient thereof lower for light having its wavelength shorter, and require high dimensional accuracy in order to ensure a level of wavelength selectivity required for recent FTTH systems. Therefore, directional couplers require a very advanced technology for manufacturing.

In the FTTH system, as described above, a wavelength band of 1550 nm is assigned to a video signal of video distribution services and a wavelength of 1310 nm and a wavelength of 1490 nm are assigned respectively to an uplink data signal and a downlink data signal in communication services. However, since interval between those wavelengths is not uniform unlike the WDM wavelength grid, it is difficult for a device for separating wavelengths in an equal interval, such as an AWG (Arrayed Waveguide Grating), to separate those wavelengths from each other. Furthermore, ONUs primarily intended for use in GE-PON communication systems communicating at an ultra-high speed may receive downlink data signals, transmitted from an OLT, including the wavelength component of a 1550 nm band, which is the wavelength band for video signals as far as they are connected to an FTTH system. In order to make an ultra-high speed communication service, such as a GE-PON communication system, available in good condition, it is necessary to sufficiently remove the wavelength component of the 1550 nm band from downlink data signals transmitted from an OLT.

Thus, in FTTH access optical communication networks, a wavelength demultiplexing device to be installed in an ONU is required which can sufficiently remove the wavelength component of the 1550 nm band to the extent that ultra-high speed communication services on the GE-PON system and the like are reliably processed and can separate and extract downlink data signals of the 1490 nm wavelength.

Furthermore, since the polarization of a signal light propagating on an optical fiber line is indefinite, optical wavelength demultiplexers usable in the FTTH system are also required to be operable polarization-independently.

SUMMARY OF THE INVENTION

It is therefore an object of the present invention to provide an optical wavelength demultiplexer which does not require high dimensional accuracy in formation of the device, and can polarization-independently separate wavelengths even when a plurality of wavelengths to be demultiplexed are not equally spaced from each other.

It is more specific object of the invention to provide an optical wavelength demultiplexer which can sufficiently remove a wavelength component of a 1550 nm band so as to be suitably provided in an ONU in an FTTH access optical communication network and can separate and extract a downlink data signal of a 1490 nm wavelength to the extent that ultra-high speed communication services can reliably be processed.

The inventor of the patent application has come to an inventive idea of implementing a wavelength demultiplexer in which an interferometer type wavelength demultiplexing device first generally demultiplexes an input light into a first wavelength band including the wavelength of 1310 nm and a second wavelength band including the wavelengths of 1490 nm and 1550 nm, and then a plurality of interferometer-type wavelength filters whose wavelength characteristics are different from each other remove stepwise unnecessary wavelength components (specifically, of a wavelength of 1550 nm in the context) from each of the first and second wavelength bands to finally separate and extract lights of wavelengths whose spectrum has been purified to the extent of being usable in an FTTH system, specifically the wavelengths being 1310 nm and 1490 nm.

In addition, the inventor has confirmed by simulations that the cross-sectional shape of a waveguide constituting the optical wavelength demultiplexer can be determined so as to allow the optical wavelength demultiplexer to operate polarization-independently.

In accordance with the present invention, the basic structure of an optical wavelength demultiplexer is of an interferometer type utilizing the interference phenomenon of light, and includes a wavelength demultiplexing device, a first wavelength filter and a second wavelength filter.

The a wavelength demultiplexing device has a first and a second output port for demultiplexing an input light received on an input port into a first wavelength band and a second wavelength band, different from the first wavelength band, to output wavelength components of the first wavelength band on the first output port and the second wavelength band from the second output port. The first wavelength filter is connected to the first output port for selecting a first predetermined wavelength component and removing a component other than the selected first wavelength component from the first wavelength band. The second wavelength filter is connected to the second output port for selecting a second predetermined wavelength component and removing a component other than the selected second wavelength component from the second wavelength band.

Each of the first wavelength filter and the second wavelength filter comprises at least one wavelength sub-filter connected in cascade of stages required in number for obtaining an output light which is to be selected with a sufficient wavelength spectrum purity from corresponding one of the first and second wavelength bands.

For example, the at least one wavelength sub-filter is provided in plural, the plural wavelength sub-filters being connected in cascade of a corresponding plurality of stages.

Alternatively, the first wavelength filter has the at least one wavelength sub-filter provided in plural, the plural wavelength sub-filters being connected in cascade of a corresponding plurality of stages required in number for obtaining the output light from the first wavelength band, the second wavelength filter having the at least one wavelength sub-filter provided in plural, the plural wavelength sub-filters being connected in cascade of a corresponding plurality of stages required in number for obtaining the output light from the second wavelength band.

In particular, one embodiment of the optical wavelength demultiplexer of the present invention may be configured so as to be suitably provided in an ONU in an FTTH access optical communication network, as read below.

The optical wavelength demultiplexing device is designed so as to be able to demultiplex light into a first wavelength band including, in the vicinity of 1310 nm, a wavelength $\lambda_1$ on the shorter wavelength side and wavelength $\lambda_2$ on the longer wavelength side than a wavelength of 1310 nm and a second wavelength band including a wavelength $\lambda_3$ of 1490 nm and a wavelength $\lambda_4$ of 1550 nm to separately output a wavelength component of the first wavelength band and a wavelength component of the second wavelength band from different output ports.

The first wavelength filter connected to one of the output ports which outputs the wavelength component of the first wavelength band of the wavelength demultiplexing device is designed so as to be able to remove the wavelength $\lambda_4$ of 1550 nm and transmit light of the wavelength of 1310 nm which falls, preferably in the middle, between the wavelengths $\lambda_1$ and $\lambda_2$.

Furthermore, to the other of the output ports which outputs the wavelength component of the second wavelength band of the wavelength demultiplexing device, the second wavelength filter is connected, which includes a first and a second wavelength sub-filter connected in series in this order in order to output an output light to be selected from the second wavelength band with a sufficient wavelength spectral purity. The first wavelength sub-filter is designed so as to be able to remove wavelength $\lambda_2$ on the longer wavelength side than the wavelength of 1310 nm and transmit the wavelength $\lambda_3$ of 1490 nm. The second wavelength sub-filter, which is connected in a subsequent stage of the first wavelength sub-filter, is designed so as to be able to remove the wavelength $\lambda_4$ of 1550 nm and transmit the wavelength $\lambda_3$ of 1490 nm.

According to the basic structure of the optical wavelength demultiplexer of the present invention, the wavelength demultiplexing device demultiplexes light into the first and second wavelength bands. In this demultiplexing, it is sufficient that light of the wavelength to be eventually extracted with its wavelength spectrum purified is included in the first and second wavelength bands, and both wavelength bands may include sufficiently broad wavelength components. Therefore, the wavelength demultiplexing device is not required to be fabricated with very high dimensional accuracy.

In addition, a single first wavelength filter, to which a transmission wavelength band is set to include only one of the lights of the wavelength to be eventually extracted with its wavelength spectrum being purified, is connected to one of the output ports of the wavelength demultiplexing device.

Alternatively, it is configured such that a plurality of first wavelength filters having different transmission wavelength bands are connected in series to the output port and each has a different transmission wavelength band and a wavelength band common to each transmission wavelength band of the plurality of first wavelength filters includes only one of the lights of the wavelength to be eventually extracted with its wavelength spectrum being purified.

Similarly, a single second wavelength filter, or alternatively, a plurality of second wavelength filters with their transmission wavelength band different from each other, to which a transmission wavelength band is set so as to include only one of the lights of the wavelength to be eventually extracted with its wavelength spectrum purified, may be connected in serial to the other of the output ports of the wavelength demultiplexing device.

With such a structure, it is not required that each of the first and second wavelength filters is formed with high dimensional accuracy to make the respective transmission wavelength bands narrow yet to be arranged at an accurate wavelength position. Furthermore, even when a plurality of wavelengths to be selected are not equally spaced from each other, the transmission wavelength bands of the wavelength demultiplexing device and the first and second wavelength filters can be easily set without being formed with high dimensional accuracy.

In addition, an optical wavelength demultiplexer operable polarization-independently is implemented by determining, according to a simulation, the cross-sectional shapes of waveguides constituting the wavelength demultiplexing device, and the first and second wavelength filters, including sub-filters, such that the optical wavelength demultiplexer is operable polarization-independently.

BRIEF DESCRIPTION OF THE DRAWINGS

The objects and features of the present invention will become more apparent from consideration of the following detailed description taken in conjunction with the accompanying drawings in which:

FIG. 4 is a schematic block diagram, like FIG. 2, showing the structure of an MMI-type optical wavelength demultiplexer in an alternative embodiment of the invention;

DESCRIPTION OF THE PREFERRED EMBODIMENTS

Figure 1:
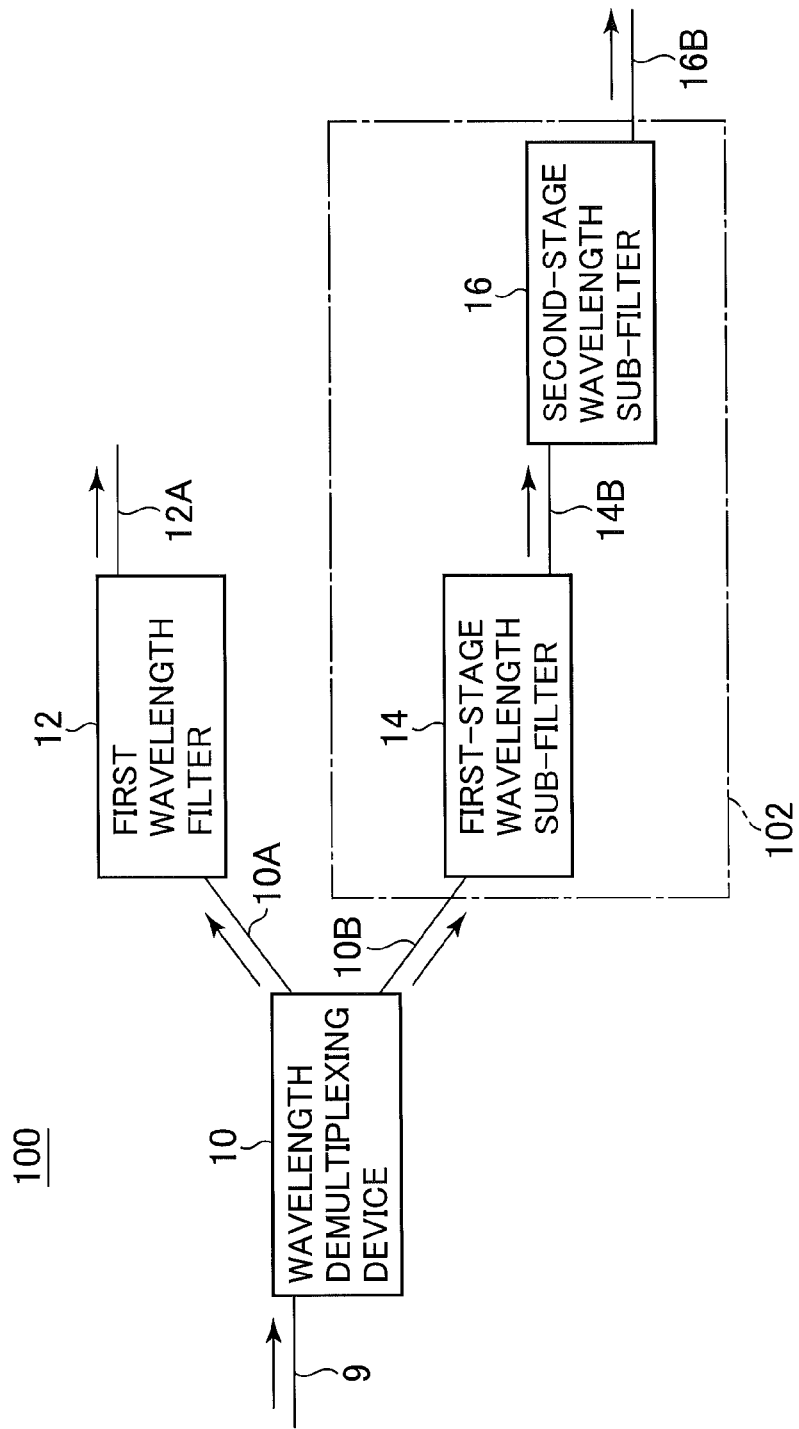
FIG. 1 is a schematic block diagram exemplarily showing the basic structure of an optical wavelength demultiplexer in accordance with a preferred embodiment of the present invention.
Figure 2:
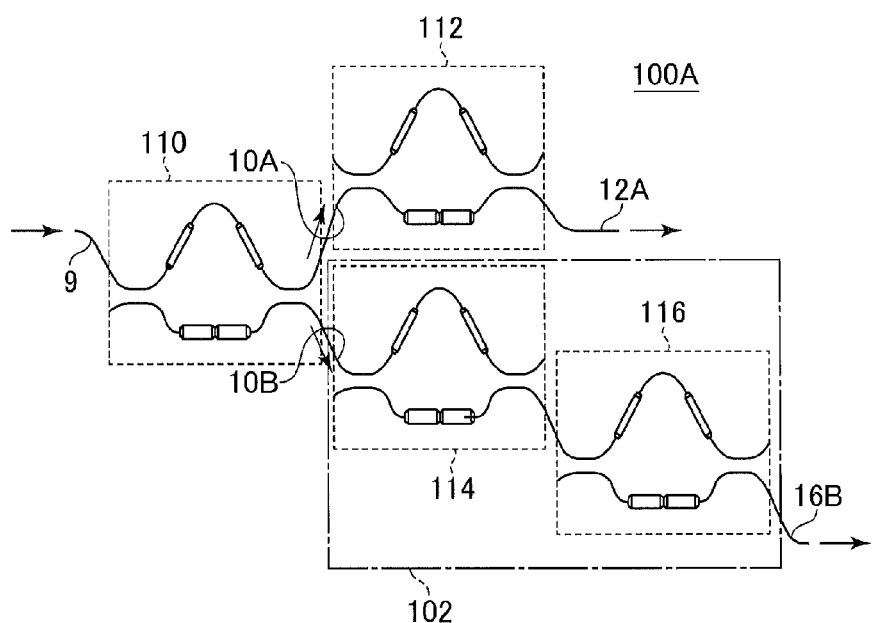
FIG. 2 is a schematic block diagram showing the structure of an MZI-type optical wavelength demultiplexer including directional couplers in the embodiment.

With reference to the accompanying drawings, preferred embodiments of the present invention will be described. Note that FIG. 1, schematically showing the basic structure of an optical wavelength demultiplexer and FIGS. 2 and 4, schematically showing the structures of MZI-type and MMI-type optical wavelength demultiplexers, respectively, are merely to illustrate configuration examples according to illustrative embodiments of the invention, and are not intended to limit the invention to those illustrated examples. In addition, the patent application includes specific constituent materials, design conditions and the like sometimes shown and described, which are merely preferred examples and, accordingly, the present invention is by no means to be understood as limitative to those.

With reference first to FIG. 1, the basic structure of an optical wavelength demultiplexer 100 of the illustrative embodiment will be described. The optical wavelength demultiplexer 100 includes a wavelength demultiplexing device 10, a first wavelength filter 12 and second wavelength filter 102. In the illustrative embodiment, the first wavelength filter 12 is provided in single whereas the second wavelength filter 102 includes sub-filters 14 and 16 interconnected in cascade as first and second stages, respectively, as shown. The first wavelength filter 12 may similarly include a plurality of wavelength sub-filters. The second wavelength filter 102 may not limitatively consists of two, but a single, three or more wavelength sub-filters. Those components, i.e. demultiplexing device, filters and sub-filters, may all be interferometer type devices using the optical interference phenomenon. The interferometer type devices may be MZI or MMI type devices with directional optical couplers, as will be described in detail later.

The wavelength demultiplexing device 10 demultiplexes an input light beam 9 into wavelength components 10A and 10B of first and second wavelength bands, respectively, to output the wavelength components 10A and 10B from corresponding output ports 10A and 10B. Signals are designated as such with the same reference numerals as ports or connections on which they are conveyed.

The first wavelength filter 12 removes wavelength components other than one to be selected from the wavelength component 10A of the first wavelength band, i.e. filters out the former components and extracts the remainder, to selectively output the wavelength component 12A thus selected. In the second wavelength filter 102, the first- and second-stage wavelength sub-filters 14 and 16 cooperatively remove, from the wavelength component 10B of the second wavelength band, wavelength components other than ones to be selected to selectively output the wavelength components thus selected.

The first wavelength filter 12, which is an interferometer type wavelength filter for the first wavelength band, and the first- and second-stage wavelength sub-filters 14 and 16, which are interferometer type wavelength filters for the second wavelength band, are different in transmission wavelength spectral characteristic from each other.

From the first wavelength filter 12, the selected wavelength component 12A is output which is one of the selected lights with a sufficient wavelength spectral purity. From the first-stage wavelength sub-filter 14, a selected wavelength component 14B is output to the second-stage wavelength sub-filter 16, and from the second-stage wavelength sub-filter 16, a selected wavelength component 16B is output, which is the other of the selected lights with a sufficient wavelength spectral purity. The wavelength component 16B thus selected is a wavelength component having passed a bandwidth that is common to, or overlapping with, the transmission wavelength bands of the first- and second-stage wavelength sub-filters 14 and 16. The selected wavelength component 16B is extracted with a sufficient wavelength spectral purity by configuring the second wavelength filter 102 into the two-stage connection of the cascaded sub-filters 14 and 16.

If the optical wavelength demultiplexer 100 shown in FIG. 1 were implemented in the form of WDM filters and installed in an ONU in an existing FTTH access optical communication network system, it would work as follows.

The input light beam 9 is a downlink signal transmitted from an OLT while an uplink signal transmitted from the ONU towards the OLT on a light beam with wavelength of 1310 nm, or "1310 nm light", part of which may be reflected by optical connectors or the like, which may be provided on the way of an optical transmission path from the ONU to the OLT, to be mixed with the input light beam 9. It is necessary for the WDM filter of the ONU to eliminate the 1310 light mixed in the input light 9 to a level equal to or below −23 dB. On the other hand, in ONUs typically configured, a wavelength component of a 1550 nm band, which is the wavelength component of video signals, is blocked already before input to the WDM filter at the stage preceding to the WDM filter. Thus, in order to render light signals on the 1490 nm wavelength of an optical carrier of the downlink data signal available in good conditions in ultra-high speed communication services such as the GE-PON communication system, it is necessary to eliminate the wavelength component of a 1550 nm band to a level equal to or below −27 dB. In order to extract the light signal of the 1490 nm wavelength with such a pure wavelength spectrum, it would not be sufficient to simply block the wavelength component of the 1550 nm band in the stage preceding the WDM filter but additionally to sufficiently remove that wavelength component. The optical wavelength demultiplexer 100 of the illustrative embodiments would then solve the above difficulties.

The wavelength demultiplexing device 10 demultiplexes the light 9 into the first and second wavelength bands, i.e. the wavelength components 10A and 10B. The wavelength component 10A includes a first wavelength $\lambda_1$ on the shorter wavelength side and a second wavelength $\lambda_2$ on the longer wavelength side than the wavelength of 1310 nm. The second wavelength component 10B includes a wavelength $\lambda_3$ of 1490 nm and a wavelength $\lambda_4$ of 1550 nm. Both demultiplexed lights beams 10A and 10B will be output from the respective output ports to the first and second wavelength filters 12 and 102.

On one hand, the first wavelength filter 12 removes the wavelength $\lambda_4$ of 1550 nm and transmits or passes light of the wavelength 1310 nm, which falls between, or preferably in the middle of, the wavelengths $\lambda_1$ and $\lambda_2$. That causes the wavelength of 1490 nm for downlink data signals and the wavelength of 1550 nm for video signals of video distribution services to completely separably be selected from the wavelength of 1310 nm for uplink data. On the other hand, the first-stage wavelength sub-filter 14 removes the second wavelength $\lambda_2$ and transmits the wavelength $\lambda_3$ of 1490 nm, and the second-stage wavelength sub-filter 16 removes the wavelength $\lambda_4$ of 1550 nm and transmits the wavelength $\lambda_3$ of 1490 nm. Thus, although the wavelength 1490 nm of data signals and the wavelength 1550 nm of video signals of video distribution services are close to each other in wavelength, the wavelength $\lambda_4$ of 1550 nm is removed while the wavelength of 1490 nm for downlink data signals is completely separably selected with a sufficient wavelength spectral purity.

In this way, the demultiplexer 100 having the wavelength demultiplexing device 10 and the first and second wavelength filters 12 and 102 configured in cascade as described above can completely remove the wavelength component of 1550 nm from the input light beam 9 which includes the wavelength component of 1550 nm and in which the 1310 nm light is multiplexed with the light with wavelength of 1490 nm, or "1490 nm light", to thereby selectively extract the light of 1490 nm with a sufficient wavelength spectral purity.

As described above, the optical wavelength demultiplexer of the present embodiment outputs the 1310 nm light from the first wavelength filter 12 with a sufficient wavelength spectral purity. This also means that if an uplink signal light of 1310 nm is input to the output port 12A of the first wavelength filter 12 in the reverse direction, the uplink signal light will proceed through the optical wavelength demultiplexer in the reverse direction against the input light 9, and be output from the input port 9 of the wavelength demultiplexing device 10. This reveals that the optical wavelength demultiplexer 100 of the illustrative embodiments is suitably installed in ONUs in a GE-PON system, in which the uplink signal light beam of 1310 nm is transmitted towards an OLT and the downlink signal light of 1490 nm is transmitted from the OLT.

Note that, in the optical wavelength demultiplexer 100 of the illustrative embodiments, the wavelength demultiplexing device 10, the first and second wavelength filters 12 and 102, including the wavelength sub-filters 14 and 16, can be formed by MZI or MMI type of interferometers. In the following, an embodiment implemented by MZI type interferometers and MMI type interferometers will be described.

Figure 3:
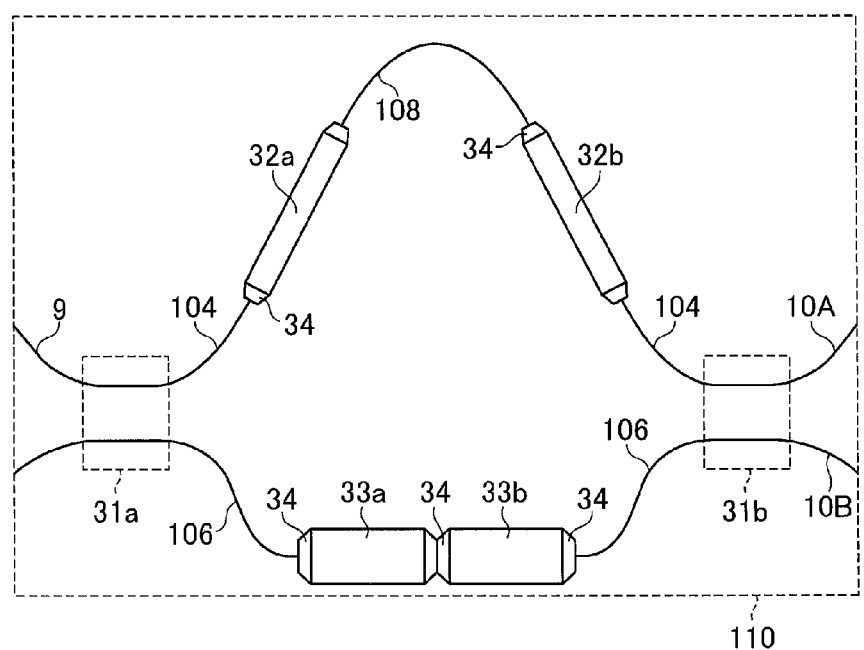
FIG. 3 schematically shows the internal structure of one of the MZI-type optical wavelength demultiplexing devices shown in FIG. 2.

With reference to FIGS. 2 and 3, the MZI type optical wavelength demultiplexer 100A with directional optical couplers 31a and 31b will be described. The MZI type optical wavelength demultiplexer 100A is configured to include an MZI type wavelength demultiplexing device 110 functioning as the wavelength demultiplexing device 10, an MZI type wavelength filter 112 as the first wavelength filter 12, an MZI type wavelength filter 114 as the first-stage wavelength sub-filter and an MZI type wavelength filter 116 as the second-stage wavelength sub-filter.

FIG. 3 specifically shows in an enlarged view the MZI type wavelength demultiplexing device 110 in detail. The remaining MZI type wavelength filters 112, 114 and 116 may similarly be configured with the constituent components thereof being different in dimension. Herein, the MZI type wavelength demultiplexing device 110 will representatively be described in detail. The MZI type wavelength filters 112, 114 and 116 are, however, designed under the technical concept common to the filter 110.

With the illustrative embodiment, the MZI type optical wavelength demultiplexer 100A has various conditions set so as to receive the input light beam 9 which includes the wavelength component of 1550 nm and in which the 1310 nm light and the 1490 nm light are multiplexed as described above to completely remove the wavelength component of 1550 nm from the input light beam 9 to thereby selectively extract the light of 1490 nm with a sufficient wavelength spectral purity. Thus, the MZI type wavelength filter 112 is adapted to remove the wavelength $\lambda_4$ of 1550 nm and transmit or pass light of the wavelength 1310 nm that is, e.g. in the middle of the first and second wavelengths $\lambda_1$ and $\lambda_2$. The MZI type wavelength filter 114 is adapted to remove the second wavelength $\lambda_2$ and transmit the wavelength $\lambda_3$ of 1490 nm, and the MZI type wavelength filter 116 is adapted to remove the wavelength $\lambda_4$ of 1550 nm and transmit the wavelength $\lambda_3$ of 1490 nm.

The MZI type wavelength demultiplexing device 110 is configured, as shown in FIG. 3, to include directional couplers 31a and 31b, and interferometer waveguides 32a, 32b, 33a and 33b, which are interconnected by optical waveguides 104, 106 and 108 as depicted.

In order to make the optical waveguides 104, 106 and 108 having the wave-guiding property thereof polarization-independent, the waveguides 104, 106 and 108 may be formed in principle to have the cross-section thereof shaped in square. However, since each of the directional couplers 31a and 31b has the couple of waveguides 104 and 107 formed therein adjacently and substantially in parallel to each other, the waveguides 104 and 106 having the cross-section shaped in square would not render the directional couplers 31a and 31b per se operative polarization-independent. Thus, the inventor has found by simulation how the lateral cross-section of the couple of waveguides 104 and 106 should appropriately be shaped for achieving a polarization-independent operation in which the optical splitting or separating characteristic is substantially the same between the TE and TM waves. As a result, it has been found that the polarization-independent operation can be achieved by shaping the cross-section of each waveguide 31a and 31b into a rectangle having its aspect ratio properly set to a specific value.

In the directional couplers 31a and 31b for use in the MZI type wavelength demultiplexing device 110, and the MZI type wavelength filters 112, 114 and 116 described later, each of the waveguides 104 and 106 constituting the directional couplers 31a and 31b has such a rectangular cross-sectional shape having its aspect ratio set under the condition that the polarization-independent operation found by simulation is achieved. Furthermore, in each of the MZI type wavelength demultiplexing device 110, and the MZI type wavelength filters 112, 114 and 116, the coupling length of the directional couplers 31a and 31b is set in correspondence with a wavelength to be separated or split specifically to the coupler in question.

In addition, the MZI type wavelength demultiplexing device 110, and the MZI type wavelength filters 112, 114 and 116 include the interferometer waveguides 32a, 32b, 33a and 33b disposed on the two optical paths in order to cause an interference phenomenon of light. In order to achieve the polarization-independent operation, on one hand, the interferometer waveguides 32a and 32b have the waveguide width thereof set different from the interferometer waveguides 33a and 33b. In the specific embodiment, the waveguide width of the interferometer waveguides 32a and 32b is 400 nm and the waveguide width of the interferometer waveguides 33a and 33b is 500 nm, but the thickness of those waveguides is commonly set to 300 nm.

On the other hand, the directional couplers 31a and 31b have the waveguide width thereof set to 285 nm, thereby accomplishing the polarization-independent operation. In other words, the directional couplers 31a and 31b have the cross-section formed into a rectangular with its aspect ratio of 285:300. Additionally, the couple of parallel waveguides 104 and 106 constituting the directional couplers 31a and 31b have the center-to-center distance therebetween set to 650 nm. Those dimensional values have been found by simulation.

The directional couplers 31a and 31b, and the interferometer waveguides 32a, 32b, 33a and 33b are different in width from the waveguides 104, 106 and 108 for use in connecting them in that way. If they were interconnected as they are, guided lights would then be scattered at junctions to cause a connection loss. In order to minimize the loss, the interferometer waveguides 32a, 32b, 33a and 33b have tapering portions 34 formed at the connecting portions thereof where waveguides of different width are jointed. However, since the tapering portions 34 may cause a phase delay in transmitting light, the tapering portions 34 have to be formed into substantially the same shape as each other. The tapering portions 34 thus shaped still involve a difference in waveguide width, which can be reduced and hence a loss can be correspondingly reduced as compared to a direct coupling without tapers, although failing to make the waveguide widths completely equal with the steps remaining. As described above, the waveguides 32a and 32b have the width of 400 nm different from the width of 500 nm of the waveguides 33a and 33b, and it is therefore possible to provide the tapering portions 34 designed correspondingly to the widths of 400 nm and 500 nm, thus rendering the types of tapers double.

With reference to FIG. 4, the MMI type optical wavelength demultiplexer 100B will be described. The MMI type optical wavelength demultiplexer 100B is configured to include an MMI type wavelength demultiplexing device 210 serving as the wavelength demultiplexing device 10, an MMI type wavelength filter 212 as the first wavelength filter 12, an MMI type wavelength filter 214 as the first-stage wavelength sub-filter 14 and an MMI type wavelength filter 216 as the second-stage wavelength sub-filter 16.

The MMI type wavelength demultiplexing device 210, and the MMI type wavelength filters 212, 214 and 216 are optical wavelength demultiplexing devices designed so as to utilize the optical interference of the MMI type waveguide under the technical concept in configuration common to each other although different in dimension of the constituent components thereof.

The MMI type optical wavelength demultiplexer 110B will be described on the assumption similar to that of the MZI type optical wavelength demultiplexer 100A described so far. Namely, various conditions are set so as to receive the input light beam 9 which includes the wavelength component of 1550 nm and in which the 1310 nm light and the 1490 nm light are multiplexed as described above to completely remove the wavelength component of 1550 nm from the input light beam 9 to thereby selectively extract the light of 1490 nm with a sufficient wavelength spectral purity. Accordingly, the MMI type wavelength filter 212 is designed to remove the wavelength $\lambda_4$ of 1550 nm and transmit light of the wavelength 1310 nm that appears, e.g. in the middle of the first wavelength $\lambda_1$ and the second wavelength $\lambda_2$. The MMI type wavelength filter 214 is adapted to remove the second wavelength $\lambda_2$ and transmit the wavelength $\lambda_3$ of 1490 nm, and the MMI type wavelength filter 216 is adapted to remove the wavelength $\lambda_4$ of 1550 nm and pass the wavelength $\lambda_3$ of 1490 nm.

The MMI type wavelength demultiplexing device 210 is formed such that, around a rectangular main MMI waveguide 41, a tapering waveguide 45 functioning the input port 9 is provided in the preceding stage to the main MMI waveguide 41, and a tapering waveguide 42 for adjusting the waveguide width, a waveguide 43 for connection and tapering waveguides 44a and 44b forming output ports 10A and 10B are provided in the subsequent stage to the main MMI waveguide 41.

The tapering waveguide 45 formed in the preceding stage to the main MMI waveguide 41 serves to conduct the input light beam 9 to the main MMI waveguide 41 with its propagation mode adjusted so as to input the input light of the zero-order propagation mode to the main MMI waveguide 41 to cause only the zero- and first-order propagation modes to be excited in the main MMI waveguide 41.

In order that the wave-separating characteristic of the MMI type wavelength demultiplexing device 210 and the wavelength selection characteristic of the MMI type wavelength filters 212, 214 and 216 become polarization-independent substantially equally for the TE and TM waves, the main MMI waveguide 41 constituting the MMI type wavelength demultiplexing device 210 has its width set to 1.65 μm, and the main MMI waveguides constituting the MMI type wavelength filters 212, 214 and 216 have the widths thereof set to 1.85 μm, 1.65 μm, 1.65 μm, respectively. The thickness of the waveguides is commonly equal to 300 nm.

Furthermore, the MMI type wavelength demultiplexing device 210, and the MMI type wavelength filters 212, 214 and 216 may be of the same configuration. The respective tapering waveguide 42 for waveguide width adjustment, waveguide 43 for connection, tapering waveguides 44a and 44b forming the output ports 10A and 10B, and tapering waveguide 45 forming the input port 9, which constitute each of the MMI type wavelength demultiplexing device 210, and the MMI type wavelength filters 212, 214 and 216 have the dimension thereof also set so as to achieve the polarization-independent operation. The dimensional values thereof are found by simulation.

Figure 5A:
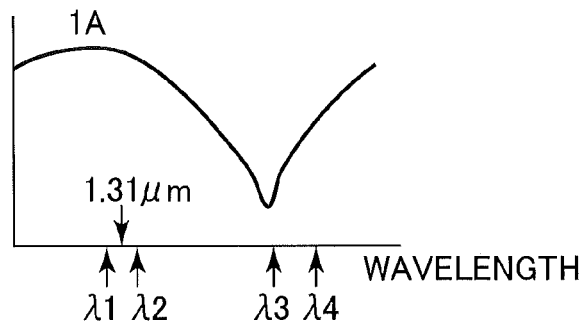
FIGS. 5A-5C and 6A-6D are graphs useful for understanding the operation of the optical wavelength demultiplexer of the illustrative embodiments.

Now, with reference to FIGS. 5A through 6D, the operation of the optical wavelength demultiplexer described above will be specifically described. FIGS. 5A, 5B and 5C plot step by step the wavelength spectra of part of the input light 9 when passing the wavelength demultiplexing device 10 and the first wavelength filter 12 in sequence. FIG. 6A to 6D plot step by step the wavelength spectra of part of the input light 9 when passing the wavelength demultiplexing device 10 and the wavelength sub-filters 14 and 16 in the second wavelength filter 102 in sequence.

Figure 5B:
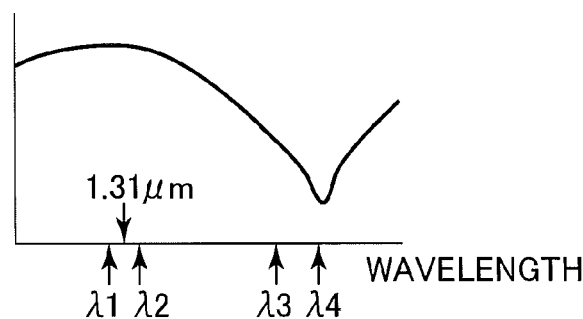

The first wavelength band, or the wavelength component 10A, output from the wavelength demultiplexing device 10 includes the first wavelength $\lambda_1$ on the shorter wavelength side and the second wavelength $\lambda_2$ on the longer wavelength side than the wavelength of 1310 nm in the vicinity of 1310 nm whereas the wavelength $\lambda_3$ of 1490 nm has been removed, as seen from FIG. 5A. The transmission wavelength spectrum of the first wavelength filter 12 has a characteristic in which the wavelength $\lambda_4$ of 1550 nm is removed and the wavelengths $\lambda_1$ and $\lambda_2$ in the vicinity of 1310 nm are transmitted as illustrated in FIG. 5B.

Figure 5C:
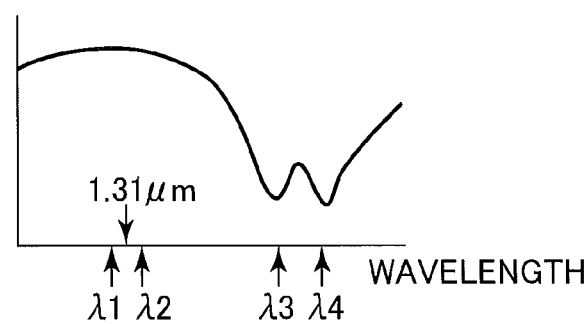

Thus, on one hand, when the input light 9 passes through the wavelength demultiplexing device 10 and the first wavelength filter 12 on one hand, the output 12A having the wavelength spectrum shown in FIG. 5C can be obtained. That means that the first wavelength filter 12 completely removes the wavelength component $\lambda_4$ to output the light with 1310 nm wavelength with a wavelength spectral purity sufficient for the output light to be selected.

Figure 6A:
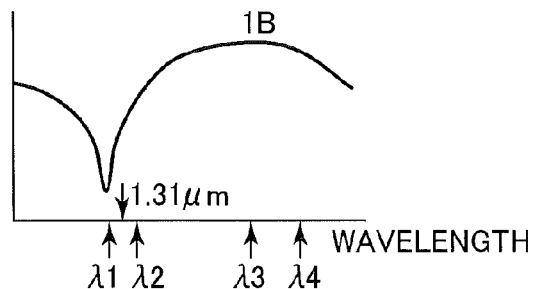
Figure 6B:
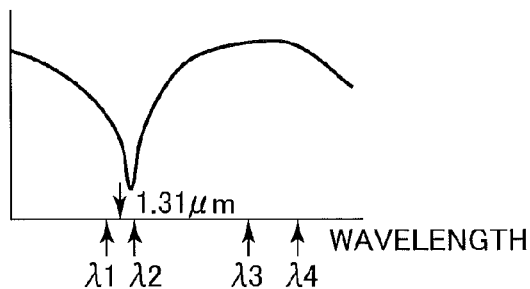
Figure 6C:
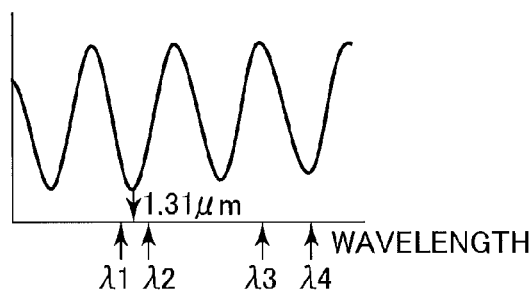
Figure 6D:
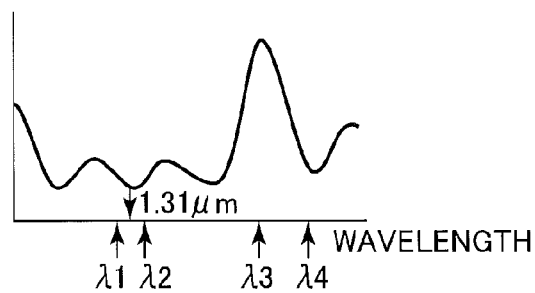

On the other hand, in the second wavelength band, or the wavelength component 10B, output from the wavelength demultiplexing device 10, the wavelength $\lambda_3$ of 1490 nm and the wavelength $\lambda_4$ of 1550 nm are included, and the wavelength $\lambda_1$ of the short wavelength side of 1310 nm in the vicinity of 1310 nm has been removed as illustrated in FIG. 6A. The transmission wavelength spectrum characteristic of the first-stage wavelength sub-filter 14 has a characteristic in which the second wavelength $\lambda_2$ is removed and the wavelength $\lambda_3$ of 1490 nm and the wavelength $\lambda_4$ of 1550 nm are transmitted as illustrated in FIG. 6B. The second-stage wavelength sub-filter 16 has its transmission wavelength spectrum characteristic in which transmitted and removed wavelengths are finely tangled with each other as seen from FIG. 6C. It is, however, important for the sub-filter 16 to have a function of allowing the wavelength $\lambda_3$ of 1490 nm to be selected as a transmission wavelength. Thus, with the second wavelength band, or the wavelength component 10B, passing through the first- and second-stage wavelength sub-filters 14 and 16 in series, the wavelength $\lambda_3$ of 1490 nm is output with a wavelength spectral purity sufficient for the output light to be selected, with the wavelength $\lambda_4$ of 1550 nm completely removed as understood from FIG. 6D.

As specifically described above, it has become clear that the optical wavelength demultiplexer 100 can be implemented in which a high dimensional accuracy in device fabrication is not required, a wavelength separation or demultiplexing is possible even when a plurality of wavelengths to be demultiplexed are not equally spaced from each other, and the wavelength component of 1550 nm, even when included more or less in the second wavelength band, can completely be removed to selectively extract the light of 1490 nm with a sufficient wavelength spectral purity.

It will now be described that numerical simulations and an experiment has confirmed the intended characteristics of the wavelength demultiplexing and selection as described above successfully achieved by the wavelength demultiplexer 100 of the illustrative embodiments which include the wavelength demultiplexing device 10, the first wavelength filter 12, the first- and second-stage wavelength sub-filters 14 and 16.

Figure 7:
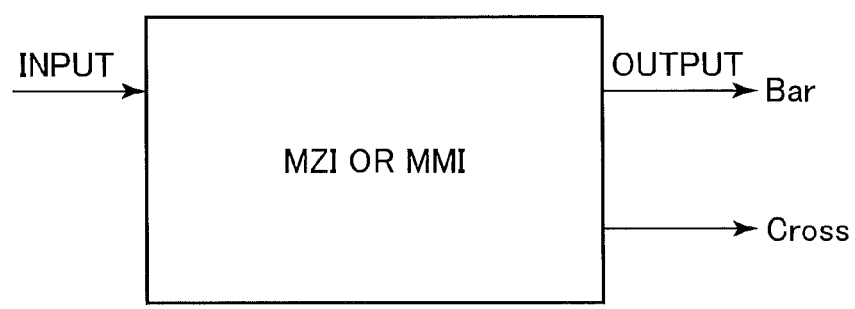
FIG. 7 is a schematic diagram for use in defining output ports of the MZI-type and MMI-type optical wavelength demultiplexers.

Now, as shown in FIG. 7, the input light beam 9 input on the input port is selected in wavelength to be developed on an output port that is positioned symmetrically to the input port 9 is defined as a Bar output port, that is, the upper output port 12A in this case, and an output port positioned asymmetrically to the input port 9 is defined as a Cross output port, that is, the lower output port in this example. In other words, the Bar output port represents an output port for outputting the selected wavelength component 12A of the first wavelength filter 12, and the Cross output port represents an output port for outputting the selected wavelength component 16B of the second-stage wavelength sub-filter 16.

Figure 8A:
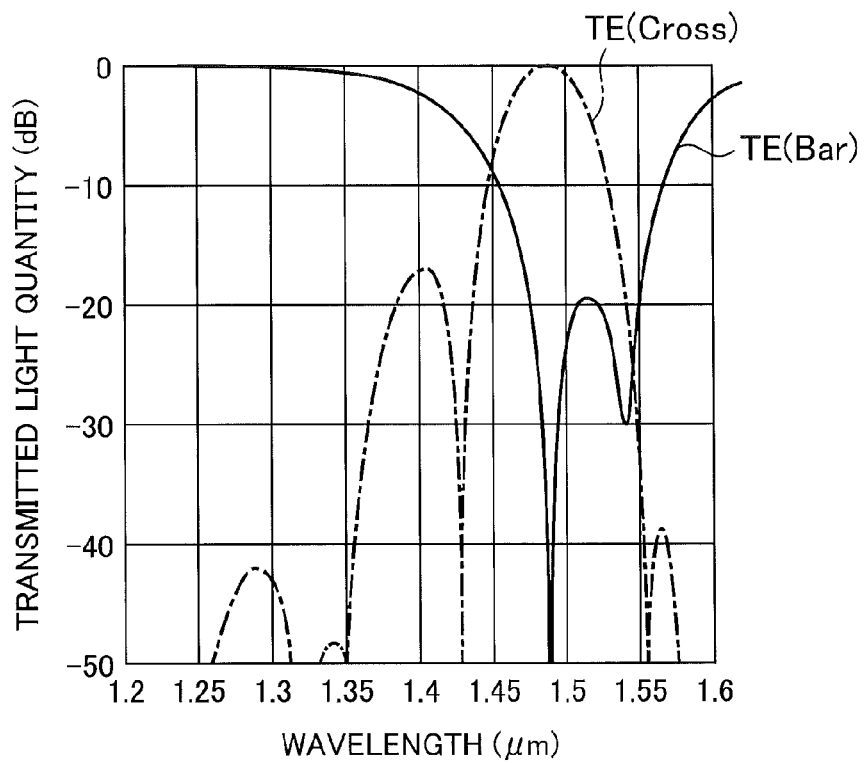
FIG. 8A plots wavelength selection characteristics of the MZI-type optical wavelength demultiplexer obtained from simulations using the finite element method.
Figure 8B:
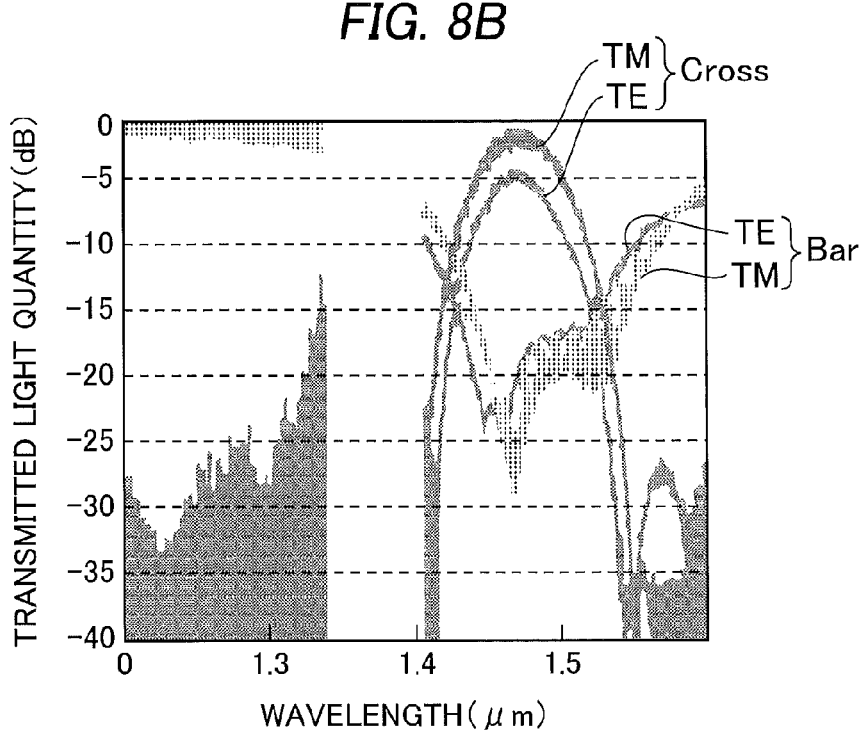
FIG. 8B plots wavelength selection characteristics of the MZI-type optical wavelength demultiplexer also but obtained from an experiment.

FIG. 8A plots results of a simulation of a wavelength selection characteristic for the MZI type optical wavelength demultiplexer 100A, FIG. 2, using the finite element method (FEM), and FIG. 8B plots the experimental result thereof. In FIGS. 8A and 8B, the horizontal axes represent the wavelength graduated in unit of μm and the vertical axes represent the transmitted light quantity graduated in dB.

FIG. 8A plots the TE component, and that is also the case with the TM component. From the figure, it can be seen that the wavelength $\lambda_3$ of 1490 nm is selected and output on the Cross output port, and the wavelength of 1490 nm is removed from the output on the Bar output port.

In FIG. 8B, the wavelength spectra of the output lights on the Bar and Cross ports are plotted for both of the TE and TM components. From FIG. 8B, data for the range between 1.35 μm and 1.41 μm is missing. This was caused by the experiment in which, although both short- and long-wavelength light sources were used in order to cover a measurement wavelength range extending between 1.2 µm to 1.6 µm, both of the light sources were weak in light intensity of the missing wavelength range, thus failing to obtain data in the missing range. Nevertheless, from FIG. 8B, it can be seen that the Bar output port outputs the wavelength $\lambda_3$ of 1490 nm selected, and the TE and TM components output from either of the Bar and Cross output ports are similar to each other for port by port, thus revealing the MZI type device under experiment having attained polarization independency.

Figure 9:
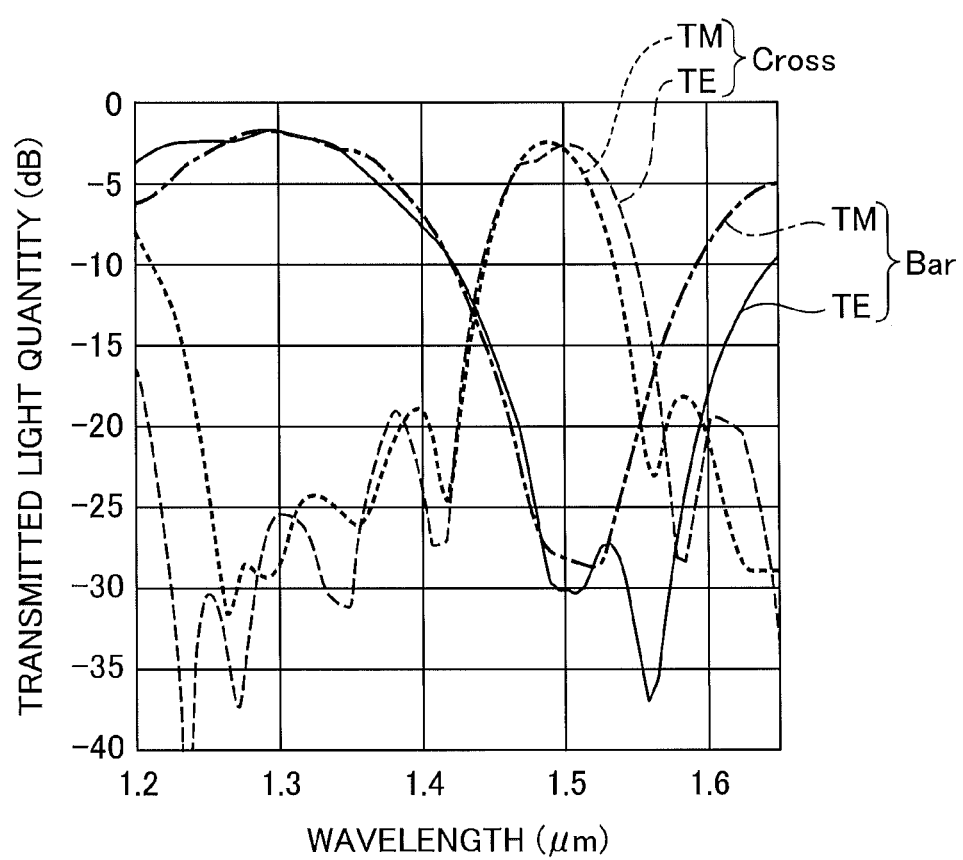
FIG. 9 plots results of simulations using Finite-difference time-domain method (FDTD) on wavelength selection characteristics of the MMI-type optical wavelength demultiplexer.

FIG. 9 shows results of a simulation of the wavelength selection characteristic of an MMI type optical demultiplexer using FDTD (Finite-Difference Time-Domain) method. In the figure, the horizontal axis represents a wavelength graduated in units of µm and the vertical axis represents a transmitted light quantity graduated in dB.

From FIG. 9, it can be seen that, in the MMI type device also, the Cross output port outputs the wavelength of 1490 nm selected for both the TE and TM components, and the Bar output port outputs the TE and TM components with the wavelength of 1490 nm removed. More specifically, it can be seen that the Bar output port develops the output light of which the wavelength spectrum characteristics are similar for both the TE and TM components, and the Cross output port develops the output light of which the wavelength spectrum characteristics are similar for both the TE and TM components, thus revealing polarization independency being achieved.

Returning now to FIGS. 2 and 4, the wavelength demultiplexing device 10, the first wavelength filter 12, and the second wavelength filter 102 including the first- and second-stage wavelength sub-filters 14 and 16, which constitute the wavelength demultiplexer 1 may be fabricated into a waveguide pattern structure on an SOI (Silicon on Insulator) substrate by the following steps, for example. SOI substrates, commonly be available on the market, include a silicon substrate, on which a silicon oxide layer is formed, and a silicon layer formed on the silicon oxide layer and having its thickness substantially equal to the thickness of a waveguide.

By dry etching, the silicon layer formed on the silicon oxide layer of the SOI substrate is removed except for the waveguide pattern structure described above. Following the dry-etching process, onto the resultant structure, a silicon oxide layer is deposited by CVD (Chemical Vapor Deposition) or the like so as to surround the waveguide pattern, which is not removed by the etching process and will serve as a core of the wave-guiding structure. Then, the silicon oxide layer is polished over its upper surface so as to be flattened to be formed as an upper clad layer.

The silicon oxide layer, which will be a clad layer, surrounding the waveguide pattern functioning as the core of the waveguide structure is structured such that the silicon oxide layer, already formed on the silicon substrate when obtaining the SOI substrate, will serve as the lower clad layer of the waveguide, and the silicon oxide layer, formed by the CVD method after the core is formed, will serve as the upper clad layer.

In that way, the waveguide pattern structure constituting the optical wavelength demultiplexer 100 of the illustrative embodiments can be formed on an SOI substrate through a well-known etching process, CVD method or the like, thus accomplishing excellent mass productivity and simple fabrication in low cost.

The entire disclosure of Japanese patent application No. 2014-081809 filed on Apr. 11, 2014, including the specification, claims, accompanying drawings and abstract of the disclosure, is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

What I claim is:

1. An optical wavelength demultiplexer comprising:
   a wavelength demultiplexing device having a first and a second output port for demultiplexing an input light received on an input port into a first wavelength band and a second wavelength band, different from the first wavelength band, to output wavelength components of the first wavelength band on the first output port and the second wavelength band from the second output port;
   a first wavelength filter connected to the first output port for transmitting a first predetermined wavelength component and removing a component other than the transmitted first wavelength component from the first wavelength band; and
   a second wavelength filter connected to the second output port for transmitting a second predetermined wavelength component and removing a component other than the transmitted second wavelength component from the second wavelength band,
   wherein each of said wavelength demultiplexing device and said first and second wavelength filters is a multimode interferometer (MMI),
   each of said first wavelength filter and said second wavelength filter comprises a single wavelength sub-filter or two or more wavelength sub-filters connected in a cascade of a predetermined number of stages to output an output light having a corresponding one of the first wavelength component and the second wavelength component,
   said first wavelength filter includes said wavelength sub-filters in plural, said plural wavelength sub-filters being connected in a cascade of a first predetermined number of stages to output the output light having the first wavelength component,
   said second wavelength filter includes said wavelength sub-filters in plural, said plural wavelength sub-filters being connected in a cascade of a second predetermined number of stages to output the output light having the second wavelength component,
   the first wavelength band is in a vicinity of a wavelength of 1310 nm, and including wavelength $\lambda_1$ on a shorter wavelength side and wavelength $\lambda_2$ on a longer wavelength side than the wavelength of 1310 nm, which falls between the wavelength $\lambda_1$ and the wavelength $\lambda_2$,
   the second wavelength band includes a wavelength $\lambda_3$ of 1490 nm and a wavelength $\lambda_4$ of 1550 nm,
   said first wavelength filter removes the wavelength $\lambda_4$ of 1550 nm from the wavelength component of the first wavelength band and transmitting light of the wavelength of 1310 nm, and
   said plural wavelength sub-filters in said second wavelength filter comprise a first wavelength sub-filter for removing the wavelength $\lambda_2$ on the longer wavelength side from the wavelength component of the second wavelength band and transmitting the wavelength $\lambda_3$ of 1490 nm, and a second wavelength sub-filter connected to said first wavelength sub-filter in cascade for removing the wavelength $\lambda_4$ of 1550 nm and transmitting the wavelength $\lambda_3$ of 1490 nm.

2. The optical wavelength demultiplexer in accordance with claim 1, wherein said multimode interferometer comprises a main MMI waveguide, and a tapering waveguide provided in a preceding stage of the main MMI waveguide to form the input port, as well as a tapering waveguide for adjusting a waveguide width, a waveguide for connection, and a tapering waveguide forming the output port, which are provided in a subsequent stage of the main MMI waveguide, the main MMI waveguide having a waveguide width set so as to attain a wave-guiding characteristic of polarization independency.

* * * * *